United States Patent Office 2,956,994
Patented Oct. 18, 1960

2,956,994

METHOD OF POLYMERIZING ETHYLENE

Karl Peterlein, Gladbeck, Germany, assignor to Gelsenberg Benzin Aktiengesellschaft, Gelsenkirken, Horst, Germany No Drawing. Filed Jan. 31, 1956, Ser. No. 562,612

Claims priority, application Germany Feb. 4, 1955

13 Claims. (Cl. 260—94.9)

The present invention relates to improvements in the polymerization of olefins, and more particularly to a method of polymerizing olefins or olefin-containing gases to high polymers mainly in the absence of liquids.

The polymerization of olefins by means of reduced heavy metal compounds such as metal organic compounds at normal pressure, reduced pressure or under extremely high pressures, as described by Karl Ziegler et al. in Angewandte Chemie, Jahrgang 67 (1955), pages 541 to 547, when such polymerization is carried out in the normal manner in the presence of suitable organic liquids, which throughout the rest of the specification and claims will be designated as "solvents," has various difficulties connected therewith.

Thus, for example, due to the sensitivity of the catalyst against various impurities, specific conditions must be adjusted concerning the utilized solvent with respect to the purity, the boiling range and the composition thereof. Due to the extreme purity requirements, a very careful prepurification is necessary, which in view of the rather large amounts of solvent utilized is extremely troublesome and expensive. In addition, after the polymerization, the polymerisate must be freed of the solvent, which requires further process steps. Since in most cases it is desired to reutilize the utilized solvent by reintroducing the same, regeneration of the solvent is necessary, which is also difficult and expensive.

It is apparent that if it were possible to carry out the polymerization of olefins, such as ethylene, without the use of large amounts of solvents, it would then be possible to avoid or at least reduce the above set forth difficulties. In attempts of the inventors to achieve this, dry polymerization of olefins, such as the ethylenes, have been attempted both with and without carriers for the utilized catalyst complex. However, prior to the present invention, the results obtained have been unsuccessful as described in detail in the following:

If the dry polymerization is carried out without a carrier, the produced polymerisate precipitates in the form of crusts or skins which forms as a coating or incrustation on the walls and other parts of the reaction vessel with which it comes in contact, and because of the non-homogeneous condition thereof, the further working up is extremely difficult. In addition, because of the insulating properties of this covering, the conducting of the heat of the reaction is greatly hindered.

The dry polymerization of the olefins such as ethylenes by the use of an introduced carrier substance for the catalyst involves other difficulties.

Because of the great sensitivity of the utilized catalysts with respect to impurities such as liquids, oxygen, acids or bases, the introduction of any foreign substance into the reaction system in order to serve as a carrier, carries with it the danger of damage or destruction of the activity of the catalysts. This leads in the practice to undesired long induction periods, before the reaction begins, or to the breaking down of the reaction too soon. With respect to the long induction time before the reaction begins, this has an additional disadvantage of requiring the use of relatively large amounts of catalysts which is of course disadvantageous when it is desired to produce products with a low ash content. As a result thereof, the yield by proceeding in this manner is quite low.

It is therefore a primary object of the present invention to provide a method of polymerizing olefins, and particularly ethylenes, or olefin-containing mixtures, which avoids all of the above enumerated difficulties of the known methods of polymerizing olefins by the use of solvents, or by the dry polymerization methods with or without the use of carriers.

It is another object of the present invention to provide a method of polymerizing olefins by a substantially dry polymerization method, that is in the absence of solvents, by the use of a carrier substance which avoids all of the difficulties present in the use of known carriers for the catalysts.

It is still another object of the present invention to provide a method of polymerizing olefins and olefin-containing mixtures, and particularly polymerizing ethylenes, whereby the polymerized product is produced in an easily controllable manner in a high state of purity and whereby the production is economical.

Other objects and advantages of the present invention will be apparent from a further reading of the specification and of the appended claims.

With the above and other objects in view, the present invention mainly consists in a method of polymerizing olefins and olefin-containing mixtures, and particularly in polymerizing ethylenes, comprising the steps of polymerizing the olefin in the presence of a catalyst in the further presence of a carrier for the catalyst which carrier for the catalyst is a polymerized olefin which has been polymerized by a solvent polymerization method and from which polymerisate the solvent has been evaporated before the polymerisate is used as a carrier for the catalyst in the dry polymerization according to the present invention. The method according to the present invention permits the avoiding of all of the above set forth disadvantages and difficulties with respect to the prior known processes of polymerizing olefins.

In other words, the present invention is mainly based upon the use as the carrier for the catalyst a small amount of freshly produced polymerisate which has been produced for the express purpose of serving as a carrier in the dry polymerization method of the present invention in the same system or vessel. This polymerisate which serves as carrier is according to the present invention first produced by the solvent polymerization method mentioned above utilizing only a small amount of a low boiling inert solvent which is removed from the reaction vessel after the polymerisate has been formed. The removal of the solvent from the polymerisate after a sufficient amount of polymerisate has been formed to serve as carrier for catalyst for the further dry polymerization according to the present invention is preferably carried out by distillation, whereby the necessary heat therefor comes from the reaction heat of the polymerization, and, if necessary, additional heat may be introduced from without the reaction vessel.

The produced solvent vapors escape from the reaction vessel together with any waste gases or excess ethylene which may be present, and these vapors can by condensation again be liquified and without further additional purification again be utilized.

A portion of this condensate can, as needed, be reintroduced into the reaction vessel. In this manner and by suitable additions of heat, it is possible to control the removal of the solvent which is needed at the beginning in the usual manner. In general, no outside heating is necessary if the solvent which is utilized is a low boiling solvent which boils at below the maximum reaction temperature. After removal of the organic liquids utilized at the beginning of the reaction, the polymerization continues in the now dry form without any further breaking off of the polymerization.

It is necessary for the trouble-free course of the further reaction to subject the entire finely divided dispersed polymerisate particles to an intensive stirring in order to obtain a good contact between the same and the gas stream. By selection of the stirring speed it is possible to control the speed of reaction within specific limits. To the extent to which the quantity of the polymerisate increases, or the effect of the catalysts decreases, fresh contact must be supplied in a suitable manner if one does not desire to be limited to operation in batches. This supplying may be done periodically or continuously, whereby, for example, the components of the catalyst may be supplied unmixed in concentrated form or diluted in a low boiling solvent, or the entire contact complex which is formed from the components thereof may be supplied as such.

The method of the present invention may be easily carried out in a continuous manner in which a portion of the polymerisate is drawn off to the extent that new product is formed.

The method of the present invention is carried out utilizing a catalyst consisting of a combination of an organic aluminium compound as reducing agent and a heavy metal compound reducible by said reducing agent. In the production of the initial small amount of polymerisate by the solvent polymerization method, which polymerisate serves as carrier for the catalyst during the further operation, a solvent consisting of individual hydrocarbons of paraffinic, naphthenic or aromatic nature or mixtures thereof, said solvent being free from oxygen, nitrogen or sulfur bearing substances containing or developing active hydrogen, the boiling point or boiling range of the solvent lying between −35 and +90° C. or halogen derivatives of the said hydrocarbons of the same boiling range, is used according to the present invention. The terms "catalyst" and "solvent" used in the appended claims refer to the above defined substances. It is particularly advantageous according to the present invention to utilize as solvent for the initial solvent polymerization those organic liquids which can be easily removed from the formed polymerisate, e.g. those organic liquids such as the easily vaporizable light hydrocarbons which under normal conditions are in gaseous form, while under increased pressure under which the same may be put in the process of the present invention the substance is in liquid form. Butane is an example of such organic liquid. By the use of such substance as butane according to the preferred embodiment of the present invention it is possible after the formation of a sufficient amount of polymerisate by the solvent polymerization method under pressure, the solvent which is liquid under pressure is easily removed by releasing the pressure and thereby vaporizing the solvent.

It should also be noted that although the present invention is discussed mainly with the polymerization of ethylene, the features of the present invention are equally applicable to the polymerization of any of the other olefins which are commonly polymerized for technical purposes.

A great advantage of the present invention lies in the fact that by the formation of the carrier substance in the same reaction vessel in which the first polymerization is carried out in liquid manner, the introduction of foreign substances which are dangerous to the contact is eliminated. Thus, it is possible by the application of a small amount of solvent to start the polymerization to obtain a certain start of the reaction and a trouble-free further continuation of the reaction.

A further advantage of the method of the present invention lies in the fact that according to the present invention it is possible to operate without large amounts of solvent, which in the normal polymerization in the presence of solvents are actually present in amounts far greater than the amount of the produced product. The use of such solvents according to the known processes may introduce impurities which damage the catalyst as well as the final product since such impurities cannot be completely removed by a precleaning of the utilized solvent.

The need for contact according to the present invention may be actually lower than with the solvent polymerization methods, which is advantageous in the production of products having a low ash content. The produced fine particle dry polymerisate can like liquids be extremely well mixed and distributed by stirring, whereby the proceeding of the reaction and the discharging of the final dry product greatly facilitates matters. The final dry product contains only traces, at most, of the solvent, and can directly be subjected to a deashing process.

The following examples are given to further illustrate the present invention, the scope of the invention not however being limited to the specific details of the examples.

*Example I*

1,000 cc. of pure n-hexane is introduced into a reaction vessel and intensively stirred with the introduction of pure ethylene. After one hour, 3 cc. of triethyl aluminum and 1 cc. of titanium tetrachloride is added. The polymerization begins immediately thereafter, as a result of which the temperature quickly increases to about 65° C. and the solvent is distilled off in the gas stream. By reintroducing a portion of the liquified distillate, the process is continued that about 50–100 g. of polymerisate is formed, before the solvent is completely removed. Thereupon, additional ethylene is introduced under intensive stirring; thereby the amount of the produced polymerisate increases. By cooling, the reaction temperature is held below 85° C. After eight hours, the experiment was stopped, although if it were continued the reaction could still proceed with the taking up of additional ethylene. At this time it was found that 460 g. of finely divided polymerisate had been formed, which in the usual manner may be further worked up.

*Example II*

6 cc. of monochlorodiethyl aluminum and 1 cc. of titanium tetrachloride is dissolved by stirring under a nitrogen atmosphere in 250 cc. of a sulfuric acid refined light gasoline having a boiling range between 50–70° C. After one hour it is transferred to a reaction vessel which is provided with a stirrer, the reaction vessel containing 750 cc. of the same gasoline. Pure ethylene is introduced into this charge whereby the polymerization begins at once with increase of temperature to above 60°. The solvent is distilled off with the gas stream and a portion of the condensate formed by condensation of the solvent is again re-introduced into the reaction vessel so that about 50 g. of polymerisate is formed before the solvent is completely removed. The removal of the last traces of the gasoline is carried out by irradiating the vessel with an infra red ray which hastens the evaporation. By the further introduction of ethylene into the now dry charge, the polymerization continues further. After ten hours, 500 g. of polyethylene is obtained.

In general, the amount of polymerisate produced by solvent polymerization needed for starting dry polymerization is at least 5% of the desired production of the polymerisate. The absolute amount must be sufficient to secure effective stirring of the dry product.

The amount of catalyst for effective polymerization ranges between 0.1–10% preferably 0.5–2% in respect to the present polymerisate and must be maintained during proceeding of polymerization.

Without further analysis, the foregoing will so fully

What is claimed as new and desired to be secured by Letters Patent is:

1. A method of polymerizing ethylene in the presence of an ethylene polymerization catalyst selected from the group consisting of the combination of an organometallic aluminum compound and of a halide of titanium, comprising the steps of subjecting ethylene to polymerization in the presence of said polymerization catalyst and of an inert hydrocarbon solvent therefor so as to form a polymerized ethylene portion; removing said solvent until said polymerized ethylene portion is substantially dry; and polymerizing additional ethylene in the presence of said polymerization catalyst and of said dry polymerized ethylene acting as carrier for said catalyst and providing contact and promoting further polymerization, said polymerizing being carried out in the absence of solvent and under thorough mixing of said additional ethylene with said catalyst and with said dry polymerized ethylene acting as carrier for said catalyst, whereby the further polymerization proceeds in substantially dry manner to produce a pure polymerizate of low ash content.

2. A method of polymerizing ethylene in the presence of an ethylene polymerization catalyst selected from the group consisting of the combination of an organometallic aluminum compound selected from the group consisting of triethyl aluminum and monochlorodiethyl aluminum, and of a halide of titanium, comprising the steps of subjecting ethylene to polymerization in the presence of said polymerization catalyst and of an inert hydrocarbon solvent therefor having a boiling point below the reaction temperature of said polymerization so as to form a polymerized ethylene portion; evaporating said solvent and substantially completely removing the same so that said polymerized ethylene portion is substantially dry; and polymerizing additional ethylene in the presence of said polymerization catalyst and of said dry polymerized ethylene acting as carrier for said catalyst and providing contact and promoting further polymerization, said polymerizing being carried out in the absence of solvent and under thorough mixing of said additional ethylene with said catalyst and with said dry polymerized ethylene acting as carrier for said catalyst, whereby the further polymerization proceeds in substantially dry manner to produce a pure polymerizate of low ash content.

3. A method of polymerizing ethylene in the presence of an ethylene polymerization catalyst selected from the group consisting of the combination of an organometallic aluminum compound selected from the group consisting of triethyl aluminum and monochlorodiethyl aluminum and of a halide of titanium, comprising the steps of subjecting ethylene to polymerization in the presence of said polymerization catalyst and of an inert hydrocarbon solvent therefor so as to form a polymerized ethylene portion; completely removing said solvent so that said polymerized ethylene portion is substantially dry; and polymerizing additional ethylene in the presence of said polymerization catalyst and of said dry polymerized ethylene acting as carrier for said catalyst and providing contact and promoting further polymerization, said polymerizing being carried out in the absence of solvent and under thorough mixing of said additional ethylene with said catalyst and with said dry polymerized ethylene acting as carrier for said catalyst, whereby the further polymerization proceeds in substantially dry manner to produce a pure polymerizate of low ash content.

4. A method of polymerizing ethylene in the presence of an ethylene polymerization catalyst selected from the group consisting of the combination of an organometallic aluminum compound and of a halide of titanium, comprising the steps of subjecting ethylene to polymerization under a predetermined superatmospheric pressure in the presence of said polymerization catalyst and of an inert hydrocarbon solvent therefor which is liquid at said superatmospheric pressure and gaseous at normal pressure so as to form a polymerized ethylene portion; reducing the pressure so as to vaporize said solvent and to substantially completely remove the thus vaporized solvent thus obtaining a substantially dry polymerized ethylene portion; and polymerizing additional ethylene in the presence of said polymerization catalyst and of said dry polymerized ethylene acting as carrier for said catalyst and providing contact and promoting further polymerization, said polymerizing being carried out in the absence of solvent and under thorough mixing of said additional ethylene with said catalyst and with said dry polymerized ethylene acting as carrier for said catalyst, whereby the further polymerization proceeds in substantially dry manner to produce a pure polymerizate of low ash content.

5. A method of polymerizing ethylene in the presence of an ethylene polymerization catalyst selected from the group consisting of the combination of an organometallic aluminum compound selected from the group consisting of triethyl aluminum and monochlorodiethyl aluminum, and of a halide of titanium, comprising the steps of subjecting ethylene to polymerization under a predetermined superatmospheric pressure in the presence of said polymerization catalyst and of butane as solvent therefor which is liquid at said superatmospheric pressure and gaseous at normal pressure so as to form a polymerized ethylene portion; reducing the pressure so as to vaporize said solvent and to completely remove the thus vaporized solvent thus obtaining a substantially dry polymerized ethylene portion; and polymerizing additional ethylene in the presence of said polymerization catalyst and of said dry polymerized ethylene acting as carrier for said catalyst and providing contact and promoting further polymerization, said polymerizing being carried out in the absence of solvent and under continuous agitating of said additional ethylene with said catalyst and with said dry polymerized ethylene acting as carrier for said catalyst, whereby the further polymerization proceeds in substantially dry manner to produce a pure polymerizate of low ash content.

6. A method of polymerizing ethylene in the presence of an ethylene polymerization catalyst selected from the group consisting of the combination of an organometallic aluminum compound and of a halide of titanium, comprising the steps of subjecting ethylene to polymerization in the presence of said polymerization catalyst and of an inert hydrocarbon solvent therefor so as to form a polymerized ethylene portion; removing said solvent until said polymerized ethylene portion is substantially dry; polymerizing additional ethylene in the presence of said polymerization catalyst and of said dry polymerized ethylene acting as carrier for said catalyst and providing contact and promoting further polymerization, said polymerizing being carried out in the absence of solvent and under thorough mixing of said additional ethylene with said catalyst and with said dry polymerized ethylene acting as carrier for said catalyst; and adding additional polymerization catalyst during the polymerization of additional ethylene, whereby the further polymerization proceeds in substantially dry manner to produce a pure polymerizate of low ash content.

7. A method of polymerizing ethylene in the presence of an ethylene polymerization catalyst selected from the group consisting of the combination of an organometallic aluminum compound selected from the group consisting of triethyl aluminum and monochlorodiethyl aluminum and of a halide of titanium, comprising the steps of subjecting ethylene to polymerization in the presence of said polymerization catalyst and of an inert hydrocarbon solvent therefor in a reaction vessel so as to form a polymerized ethylene portion; removing said solvent from said reaction vessel until said polymerized ethylene portion is substantially dry; and polymerizing additional ethylene in said reaction vessel in the presence of said polymerization catalyst and of said dry polymerized ethylene acting as carrier for said catalyst and providing contact and promoting further polymerization, said polymerizing being carried out in the absence of solvent and under continuous agitation of said additional ethylene in said reaction vessel with said catalyst and with said dry polymerized ethylene acting as carrier for said catalyst, whereby the further polymerization proceeds in substantially dry manner to produce a pure polymerizate of low ash content.

8. A method of polymerizing ethylene in the presence of an ethylene polymerization catalyst selected from the group consisting of the combination of an organo-metallic aluminum compound and of a halide of titanium, comprising the steps of subjecting ethylene to polymerization in the presence of said polymerization catalyst and of an inert hydrocarbon solvent therefor in a reaction vessel so as to form a polymerized ethylene portion; removing said solvent from said reaction vessel until said polymerized ethylene portion is substantially dry; polymerizing additional ethylene in said reaction vessel in the presence of said polymerization catalyst and of said dry polymerized ethylene acting as carrier for said catalyst and providing contact and promoting further polymerization, said polymerizing being carried out in the absence of solvent and under continuous agitation of said additional ethylene in said reaction vessel with said catalyst and with said dry polymerized ethylene acting as carrier for said catalyst; and continuously removing dry polymerized ethylene from said reaction vessel and continuously introducing additional non-polypolymerized ethylene into said reaction vessel, whereby polymerized ethylene is continually formed in said reaction vessel and polymerization proceeds in substantially dry manner to produce a pure polymerizate of low ash content.

9. A method of polymerizing ethylene in the presence of an ethylene polymerization catalyst selected from the group consisting of the combination of an organo-metallic aluminum compound selected from the group consisting of triethyl aluminum and monochlorodiethyl aluminum, and of a halide of titanium, comprising the steps of subjecting ethylene to polymerization in the presence of said polymerization catalyst and of an inert hydrocarbon solvent therefor so as to form a polymerized ethylene portion; completely removing said solvent so that said polymerized ethylene portion is substantially dry; and polymerizing additional ethylene in the presence of said polymerization catalyst and of said dry polymerized ethylene acting as carrier for said catalyst and providing contact and promoting further polymerization, said polymerizing being carried out in the absence of solvent and under thorough mixing of said additional ethylene with said catalyst and with said dry polymerized ethylene acting as carrier for said catalyst, whereby the further polymerization proceeds in substantially dry manner to produce a pure polymerizate of low ash content.

10. A method of polymerizing ethylene in the presence of an ethylene polymerization catalyst selected from the group consisting of the combination of an organo-metallic aluminum compound selected from the group consisting of triethyl aluminum and monochlorodiethyl aluminum, and of a halide of titanium, comprising the steps of subjecting ethylene to polymerization under a predetermined superatmospheric pressure in the presence of said polymerization catalyst and of an inert hydrocarbon solvent therefor which is liquid at said superatmospheric pressure and gaseous at normal pressure so as to form a polymerized ethylene portion; reducing the pressure so as to completely vaporize said solvent and to completely remove the thus vaporized solvent thus obtaining a substantially dry polymerized ethylene portion; and polymerizing additional olefin in the presence of said polymerization catalyst and of said dry polymerized ethylene acting as carrier for said catalyst and providing contact and promoting further polymerization, said polymerizing being carried out in the absence of solvent and under continuous agitation of said additional ethylene with said catalyst and with said dry polymerized ethylene acting as carrier for said catalyst, whereby the further polymerization proceeds in substantially dry manner ot produce a pure polymerizate of low ash content.

11. A method of polymerizing ethylene in the presence of an ethylene polymerization catalyst selected from the group consisting of the combination of an organo-metallic aluminum compound selected from the group consisting of triethyl aluminum and monochlorodiethyl aluminum and of a halide of titanium, comprising the steps of subjecting ethylene to polymerization in the presence of said polymerization catalyst and of an inert hydrocarbon solvent therefor substantially free of impurities so as to form a polymerized ethylene portion; removing said solvent until said polymerized ethylene portion is substantially dry; and polymerizing additional ethylene in the presence of said polymerization catalyst and of said dry polymerized ethylene acting as carrier for said catalyst, whereby the further polymerization proceeds in substantially dry manner to produce a pure polymerizate of low ash content.

12. In a method of dry polymerization of ethylene in the presence of an ethylene polymerization catalyst selected from the group consisting of the combination of an organo-metallic aluminum compound and of a halide of titanium, the step of agitating ethylene in the presence of said polymerization catalyst and in the presence of dry polymerized ethylene produced by solvent polymerization of ethylene and which has been freed of solvent, said dry polymerized ethylene acting as carrier for said catalyst and providing contact and promoting further polymerization, said polymerizing being carried out in the absence of solvent and under thorough mixing of said ethylene with said catalyst and with said dry polymerized ethylene acting as carrier for said catalyst, whereby the polymerization proceeds in substantially dry manner to produce a pure polymerizate of low ash content.

13. In a method of polymerizing ethylene, the improvement consisting in the step of subjecting ethylene to polymerization in the presence of an ethylene polymerization catalyst selected from the group consisting of the combination of an organo-metallic aluminum compound selected from the group consisting of triethyl aluminum and monochlorodiethyl aluminum, and of a halide of titanium and also in the presence of a dry, polymerized ethylene of the type to be polymerized, and in the absence of solvent, so as to polymerize said ethylene, whereby said dry polymerized ethylene acts as carrier for said catalyst to provide contact and promote polymerization of said ethylene, so that said polylmerization proceeds in a substantially dry manner.

References Cited in the file of this patent

UNITED STATES PATENTS

| | | |
|---|---|---|
| 2,692,261 | Peters et al. | Oct. 19, 1954 |
| 2,728,757 | Field et al. | Dec. 27, 1955 |
| 2,795,574 | Feller | June 11, 1957 |
| 2,825,721 | Hogan et al. | Mar. 4, 1958 |

FOREIGN PATENTS

| | | |
|---|---|---|
| 534,792 | Belgium | Jan. 31, 1955 |
| 533,362 | Belgium | May 16, 1955 |
| 307,308 | Great Britain | June 4, 1930 |
| 723,169 | Great Britain | Aug. 29, 1952 |